Nov. 20, 1951 N. W. ROOP 2,575,770
NESTING KITCHEN CANISTER SET
Filed Oct. 18, 1950

INVENTOR
Nathan W. Roop

BY *W. S. McDowell*

ATTORNEY

Patented Nov. 20, 1951

2,575,770

UNITED STATES PATENT OFFICE 2,575,770

NESTING KITCHEN CANISTER SET

Nathan W. Roop, Columbus, Ohio, assignor to Columbus Plastic Products, Inc., Columbus, Ohio, a corporation of Ohio Application October 18, 1950, Serial No. 190,703

2 Claims. (Cl. 220—97)

The present invention relates generally to receptacles used in storing various food products and condiments for kitchen use, and more particularly to a kitchen canister set of the type embodying a plurality of nesting receptacle bodies.

The ordinary kitchen canister set generally comprises a plurality of cylindrical container bodies of different diameters and lengths which, when emptied of their contents, are arranged to telescope or nest one within the other progressively from the smallest to the largest of the receptacles to permit of convenient handling and storage of the complete set of receptacles as a unit. However, from the standpoint of the manufacturer and distributor of such canister sets, considerable difficulty has been encountered in the packaging for shipment of cylindrical canister bodies.

It will be manifest that in the usual cylindrical-type canister set, the individual canisters are arranged to nest one within the other with the outer side walls of the smaller canisters relatively spaced from the inner side walls of the next larger canisters. Due to the relative spacing between the nested canisters, the same are free to become laterally and vertically displaced with respect to one another to permit consequent abrasion of the outer side walls of the smaller canisters against the inner side walls of the larger, with the result that the ornamental finish of the canisters is damaged or destroyed.

It follows, therefore, that the primary object of the present invention is to provide a kitchen canister set comprising a plurality of nesting or telescoping canister bodies of identical configuration, but of different sizes, which are arranged to nest one within the other progressively from the smallest to the largest canister body, and which, when so nested, are prevented from relative lateral and vertical displacement by reason of an interfitting relationship provided between the individual handle portions provided on a removable lid for each canister body.

Another object of the present invention is to provide a kitchen canister set which comprises a plurality of identically shaped cubical receptacle bodies of generally rectangular cross-sectional configuration which are sized to fit one within the other, with the side walls of the individual canister bodies disposed in spaced relation to the inner side walls of the next adjacent canister bodies, and wherein each of the canister bodies is provided with a removable closure lid having a centrally disposed hollow knob arranged to receive the outer surface of the knob of the next adjacent smaller canister in a manner to hold each of the canisters in axial alignment when nested to prevent lateral and vertical displacement of the bodies when subjected to jarring forces during handling or shipment, whereby to prevent damage to the ornamental exterior surfaces of the individual canisters.

For a further and more detailed understanding of the present invention and the various additional objects and advantages realized therefrom, reference is made to the following description and the accompanying drawing, wherein.

Figure 1:
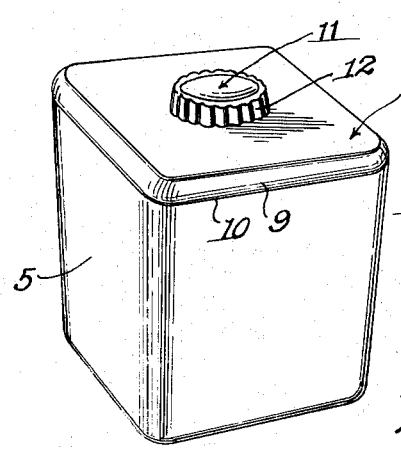
Fig. 1 is a perspective view of one of the canister bodies and its associated closure lid.
Figure 2:
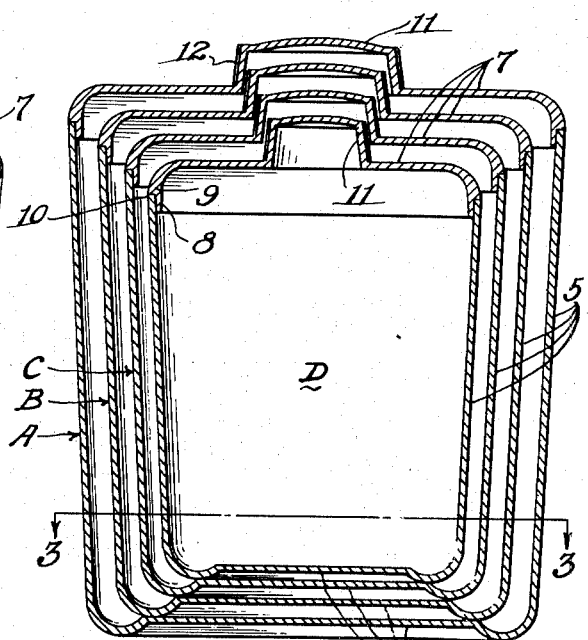
Fig. 2 is a medial vertical sectional view taken through the present canister set with the individual canisters occupying their nested positions.
Figure 3:
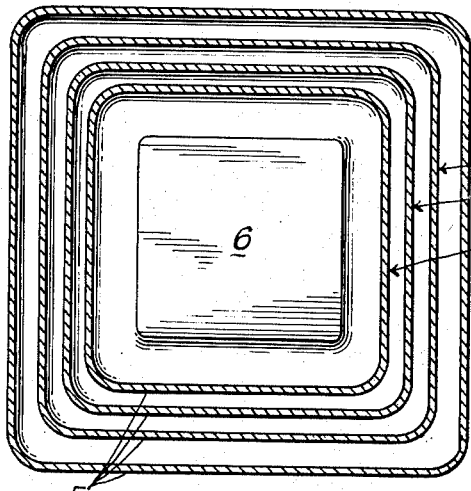
Fig. 3 is a horizontal sectional view taken along the line 3—3 of Fig. 2.
Figure 4:
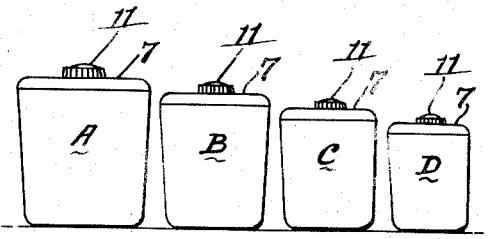
Fig. 4 is a side elevational view of the complete canister set, with each canister removed one from the other.

Referring now to the drawing, the present invention provides a plurality of identically shaped, but progressively diminished, cubical canister bodies generally designated by the letters A, B, C and D, respectively. Each canister comprises an open top cubical receptacle portion formed with perpendicularly related upstanding side walls 5 and a bottom wall 6. The bottom wall of each canister is provided with an inwardly projecting raised central portion bounded by an arcuately rounded marginal edge upon which the individual canisters rest, and which facilitates nesting of the individual canisters, as will be hereinafter more fully explained. The side walls 5 of the receptacle bodies are inclined slightly outwardly from their lower to their upper ends making the receptacles slightly larger at their upper open ends than at their lower ends, as shown particularly in Fig. 2 of the drawing.

Each receptacle is provided with a substantially square removable closure lid 7 which is formed along its lower marginal edge to provide a depending marginal edge skirt or web 8 and a shouldered ledge 9 for flush fitting engagement with the upper marginal edge 10 of the receptacle body. Preferably, the skirt 8 is formed to frictionally, but removably, engage the inner side walls of the receptacle body to provide a close frictional fit between the closure lid and the receptacle body, while the shouldered region 9 provides a flush fit between the receptacle and the rounded outer edge surface of the closure lid to enhance the overall appearance of the canister.

Each of the closure lids, in its central region, is formed to provide an upwardly projecting handle knob 11 of generally circular cross section. Each of the knobs 11 is hollow and tapers upwardly, and is formed upon its outer side surface with a fluted or scalloped region 12.

The individual canister bodies are preferably formed from cast or molded plastic material, and are sized or proportioned with respect to each other so as to permit the nesting of the individual canisters progressively one within the other to facilitate storage and handling. As shown particularly in Fig. 2, the depth of the individual canisters is proportioned so that the knobs 11 of the closure lids telescope one within the other when the receptacle bodies are positioned in progressive nesting relation with the lids applied. The outer fluted or scalloped surface 12 of the knob of the smallest canister closely fits within the hollow knob of the next adjacent and larger canister, and so on, in order that each canister, when occupying its nested position, will be maintained in axial alignment to prevent relative lateral and vertical displacement of the canisters with respect to one another when occupying their nested positions. Further, the recessed bottom walls 6 of the receptacles enable each receptacle to be supported on the relatively reduced area provided by the arcuate marginal edge of the bottom walls to further reduce the relative contacting surfaces of the canisters.

In view of the foregoing, it will be seen that the present invention provides an efficient and attractive kitchen canister set which provides for the progressive nesting of the individual canister bodies one within the other in a manner to prevent relative movement between the canisters when occupying their nested positions to greatly reduce the possibility of damage or breakage to the canisters during handling or shipment. The canisters of the present invention readily lend themselves to formation from molded synthetic resinous materials, and when so formed, present a pleasing and attractive appearance.

I claim:

1. A kitchen canister set comprising a plurality of nested separable receptacles, said receptacles progressively increasing in size with each receptacle outwardly of the smallest receptacle enclosing all receptacles inwardly thereof, each said receptacle including a displaceable lid, each said lid having a knob extending exteriorly thereof, said knobs respectively increasing progressively in size from the smallest receptacle outwardly and said knobs interfitting one within the other when said receptacles with their covers thereon are nested one within the other and maintaining the receptacles nested against undue movement relative to each other.

2. A kitchen canister set according to claim 1 wherein said receptacles are approximately rectangular and wherein each lid has a depending marginal skirt in frictional telescopic engagement with the remainder of the receptacle in which it is included.

NATHAN W. ROOP.

REFERENCES CITED

The following references are of record in the file of this patent:

UNITED STATES PATENTS

| Number | Name | Date |
|---|---|---|
| 109,739 | Huntly | Nov. 29, 1870 |
| 947,863 | Steel | Feb. 1, 1910 |
| 1,094,712 | Gale | Apr. 28, 1914 |
| 1,509,524 | Morrison | Sept. 23, 1924 |
| 2,412,325 | Devine et al. | Dec. 10, 1946 |
| 2,479,765 | Mower | Aug. 23, 1949 |